(12) United States Patent
Garbarino

(10) Patent No.: US 8,284,514 B1
(45) Date of Patent: Oct. 9, 2012

(54) DISK DRIVE HAVING A CLAMP FASTENER WITH A CONVEX HEAD

(75) Inventor: Jonathan M. Garbarino, San Jose, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 15 days.

(21) Appl. No.: 12/824,538

(22) Filed: Jun. 28, 2010

(51) Int. Cl.
*G11B 17/02* (2006.01)
(52) U.S. Cl. .................................. 360/99.08; 360/99.12
(58) Field of Classification Search ............... 369/47.36; 360/99.12, 98.08, 99.05
See application file for complete search history.

(56) References Cited

U.S. PATENT DOCUMENTS

| | | | | |
|---|---|---|---|---|
| 5,694,269 | A * | 12/1997 | Lee | 360/98.08 |
| 6,822,826 | B2 * | 11/2004 | Choo et al. | 360/99.12 |
| 6,850,389 | B2 * | 2/2005 | Drake et al. | 360/99.12 |
| 7,023,657 | B2 * | 4/2006 | Sohn et al. | 360/99.08 |
| 7,057,852 | B1 * | 6/2006 | Butler et al. | 360/99.12 |
| 7,787,214 | B2 * | 8/2010 | Miyamori et al. | 360/99.12 |

* cited by examiner

*Primary Examiner* — Nabil Hindi

(57) ABSTRACT

Disclosed is a clamp fastener that includes a convex head to prevent damage due to contact from a cover of a disk drive. The disk drive comprises a disk, a spindle motor, a disk clamp mounted to a top surface of the disk, and a clamp fastener. The clamp fastener includes a convex head. The clamp fastener is mounted through the disk clamp to connect the disk clamp and the disk to the spindle motor such that the spindle motor spins the disk, wherein the convex head is nearer to the cover than the disk clamp.

22 Claims, 4 Drawing Sheets

US 8,284,514 B1

DISK DRIVE HAVING A CLAMP FASTENER WITH A CONVEX HEAD

BACKGROUND

Computing devices are routinely used at work, at home, and everywhere else. Computing devices advantageously enable electronic communication, data sharing (e.g., documents, pictures, music, film, etc.), the use of application-specific software, and access to information for electronic commerce through the Internet and other computer networks.

The term computing device generally refers to desktop computers, laptop computers, mobile computing devices (e.g., personal digital assistants (PDAs), cell-phones, etc.), as well as any other type of computer system. A computing device typically includes a processor and a memory as well as other types of electronic devices, such as, a disk drive.

Disk drives typically employ a moveable head actuator to frequently access large amounts of data stored on a disk. One example of a disk drive is a hard disk drive. A conventional hard disk drive has a head disk assembly ("HDA") including at least one magnetic disk ("disk"), a disk clamp and a disk screw to mount the disk to a spindle motor that rapidly rotates the disk, and a head stack assembly ("HSA") that includes a moveable actuator arm and a head gimbal assembly ("HGA") with a moveable transducer head for reading and writing data. The HSA forms part of a servo control system that positions the moveable head over a particular track on the disk to read or write information from and to that track, respectively.

As disk drives are becoming smaller and smaller and are being actively utilized more and more by individuals both as moveable external disk drives for multiple computing devices and for use with smaller computing devices such as mobile devices (e.g. PDAs, cell-phones, etc.) they are increasingly being subjected to more and more pinch by individuals. Pinch generally refers to pressure against the external cover of the disk drive that may cause contact with the internal components of the disk drive such as the disk clamp, the disk screw, the disk, and the HSA. Unfortunately, such pinch contact may cause failure of the disk drive by the spindle motor stopping rotation of the disk, damage to the internal components of the disk drive by the cover contacting the internal components, damage to the disk media by the head contacting the disk media, and contamination by the cover contacting the internal components of the disk drive.

Accordingly, more efficient techniques to reduce pinch between the cover and the internal components of the disk drive are sought after.

DETAILED DESCRIPTION

Figure 1:
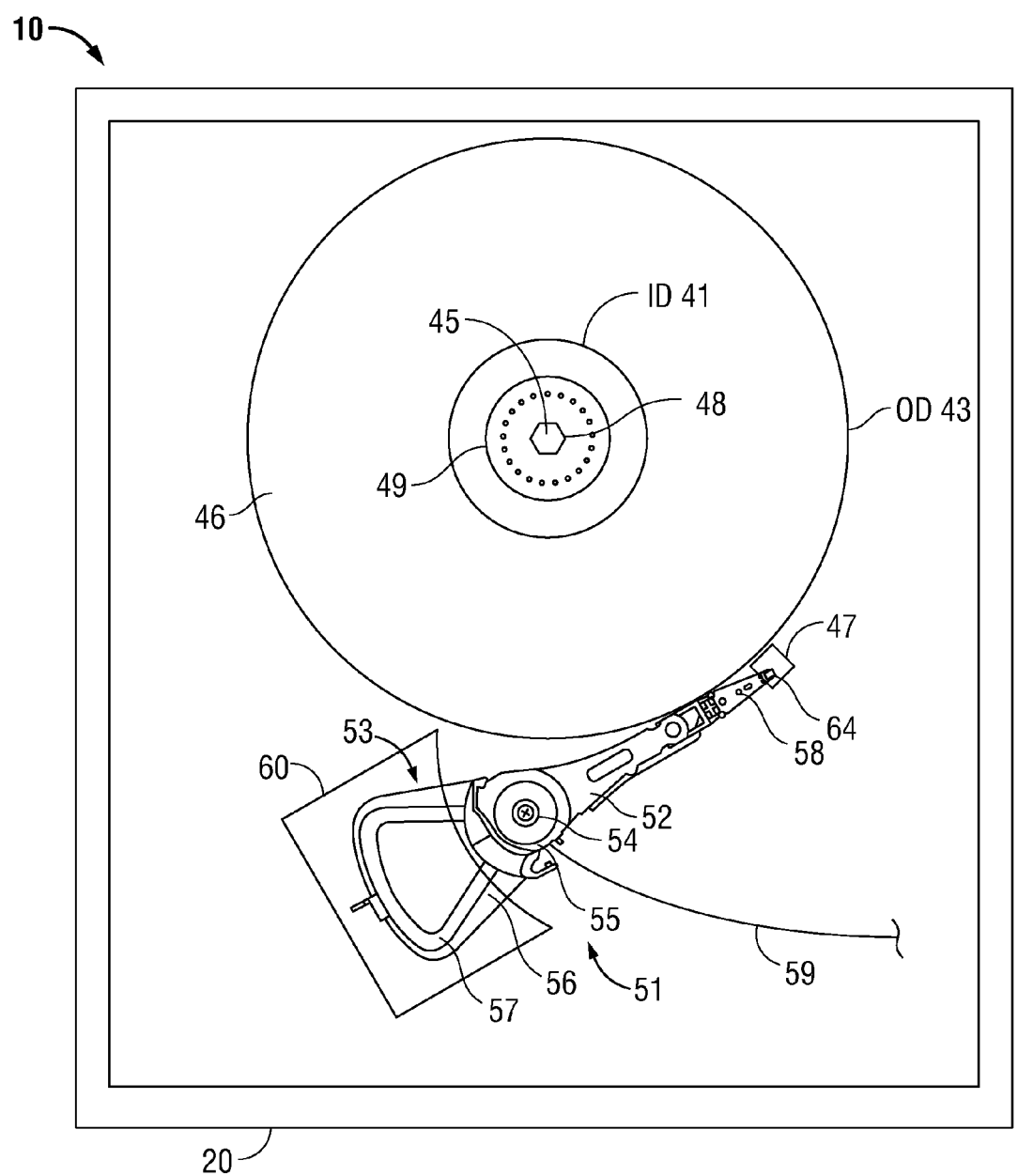
FIG. 1 is a schematic diagram of a disk drive with the cover removed.

FIG. 1 is a schematic diagram of a hard disk drive 10 with the cover removed. FIG. 1 shows the components of the hard disk drive 10 assembled within the base plate 20. In this example of a hard disk drive, a rotary actuator assembly 51 is shown relative to a disk 46 for pivoting the head 64 of the rotary actuator 51 about the disk to perform disk drive operations including read/write operations, as well as, other disk drive operations.

Disk 46 may be mounted within the disk drive 10 on a spindle 45 utilizing a disk clamp 49 for rapid rotation within the disk drive. Further, according to one embodiment of the invention, a clamp fastener 48 having a convex head, as will be described in more detail, is mounted through the disk clamp 49 to connect the disk clamp 49 and the disk 46 to the spindle motor as part of the spindle such that the spindle motor spins the disk 46.

The rotary actuator 51 in turns moves head 64 over the disk 46. The rotary actuator 51 may be part of a head stack assembly (HSA). It should be appreciated that HSAs and rotary actuators are well known in the art, and this is but one example.

Looking at this particular example, rotary actuator 51 may include a head gimbal assembly (HGA) 58 to which a head 64 is mounted, a body portion 55 having a pivot bore for receipt of a pivot bearing cartridge 54, at least one actuator arm 52 cantilevered from the body portion 55, and a coil assembly 53 cantilevered from the body portion 55 in an opposite direction from the actuator arm 52. The actuator arm 52 supports HGA 58 which supports head 64 for writing and reading data to and from the disk 46, respectively.

A flex circuit cable 59 connects to the processing circuitry of the printed circuit board assembly of the disk drive to the rotary actuator 51 of the HSA in order to deliver commands such as read/write commands, seeking and tracking commands, etc.

The coil assembly 53 may include a coil 57 and a fork 56. The fork 56 may be cantilevered from the body portion 55 in an opposite direction from the actuator arm 52 and mounts the coil 57. The rotary actuator 51 is pivotally secured to the base of the disk drive via the pivot bearing cartridge 54 through the pivot bore of the body portion 55 of the rotary actuator arm 51. In this way, the head 64 at the distal arm of the HGA 58 may be moved over a surface of the disk 46. However, in this example, the HGA 58 and the head 64 are shown as being parked on a ramp 47.

Further, it should be appreciated that the rotary actuator 51 may include a vertical stack of HGAs supported by multiple actuator arms for use with multiple vertically stacked disks 46.

Also, as is well known, a voice coil motor (VCM) may be utilized with the rotary actuator 51 in order to precisely position actuator 51 under the control of a servo controller. In one example, the VCM may include one or more VCM plates 60 which include a permanent magnet. The coil 57 of the rotary actuator 51 may be disposed between the top and bottom VCM plates (only top plate 60 being shown) in order to form a voice coil motor (VCM) to cause the pivoting of the actuator 51 about the pivot access defined by the pivot bearing cartridge 54 by inputting current into the coil 57. Thus, the VCM can be used to controllably position the head 64 of the actuator 51 relative to the disk. As an example, the head 64 may be moved between the outer diameter (OD) 43 and the inner diameter (ID) 41 of the disk 46.

However, it should be appreciated that many other types of actuators and positioning means for the actuator may be utilized, and this is just one example. Moreover, this is just one example of a hard disk drive (HDD) 10, and a wide variety of different types of disk drives, may be utilized with embodiments of the invention. Further, in this example, disk 46 is a perpendicular media recording (PMR) disk, but other types of disks may be utilized.

Figure 2:
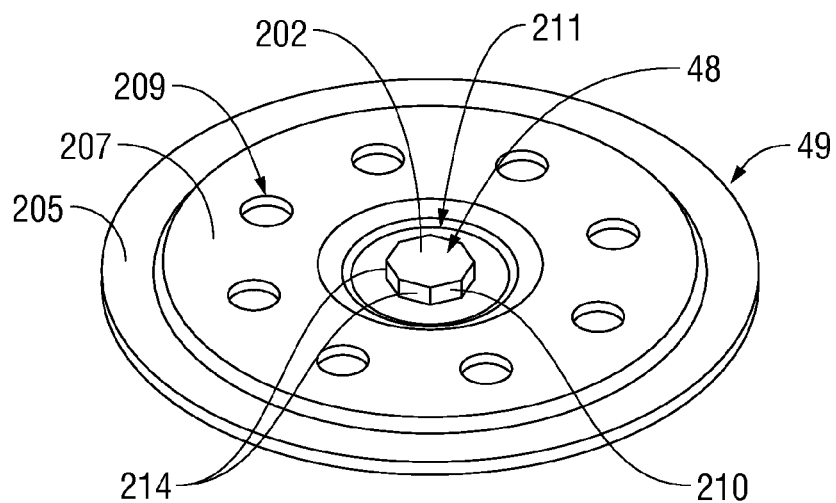
FIG. 2 is a perspective view of a clamp fastener mounted through a disk clamp, according to one embodiment of the invention.

FIG. 2 is a perspective view of the clamp fastener 48 mounted through the disk clamp 49, according to one embodiment of the invention. In this example, the clamp fastener 49 is generally circular-shaped with an outer section 205, an elevated middle section 207 that has a plurality of holes 209 used for balancing, and a recessed inner portion 211 for receipt and mounting of the clamp fastener 48. As previously described, clamp fastener 48 is mounted through disk clamp 49 to connect the disk clamp 49 and the disk 46 to the spindle motor such that the spindle motor spins the disk.

Figure 3A:
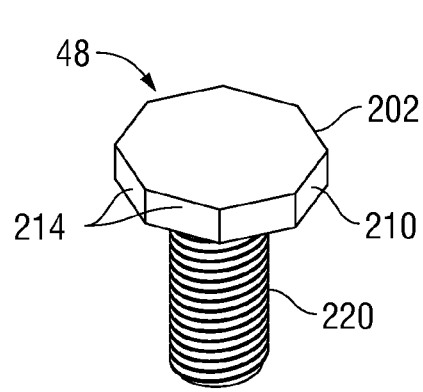
FIG. 3A is perspective view of a clamp fastener, according to one embodiment of the invention.
Figure 3B:
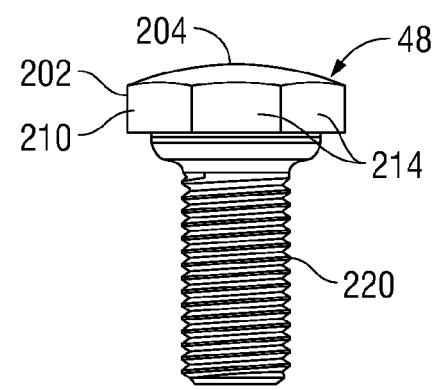
FIG. 3B is side view of a clamp fastener, according to one embodiment of the invention.

In one embodiment, clamp fastener 48 has a convex head. With reference also to FIGS. 3A and 3B, perspective and side views of clamp fastener 48 are also shown to illustrate this embodiment of the invention. As can be particularly seen in FIG. 3B, clamp fastener 48 may have a convex head 202. In one embodiment, the convex head 202 may be dome-shaped 204. Further, the convex head 202 may typically include an outer surface 210 for torqueing. In particular, the outer surface may include a plurality of outer edges 214 for torqueing.

In one particular embodiment, the outer edges 214 of the outer surface 210 of the clamp fastener 48 form a hexagonal cap for torqueing. Thus, as shown in FIGS. 2, 3A, and 3B, a clamp fastener 48 having a convex head 202 that is dome-shaped along with outer edges 214 form a hexagonal cap for torqueing is illustrated.

The clamp fastener 48 having a dome-shaped convex head 204 along with a hexagonal cap, as illustrated in FIGS. 2, 3A, and 3B, is shown as a screw or bolt with a threaded shank 220, as just one exemplary embodiment. It should be appreciated that a wide variety of different types of fasteners such as screws, bolts, sockets, rivets, joints, nails, hooks, cables, pins, etc., as would be apparent to those of skill in the art, with a convex head may be utilized to implement embodiments of the invention.

Figure 4:
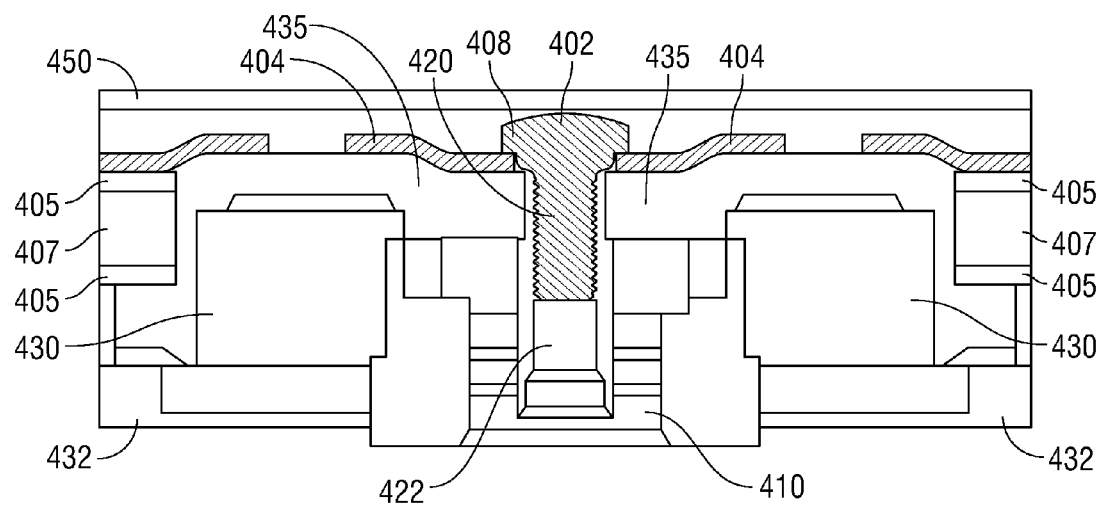
FIG. 4 is a cross-sectional view showing a dome-shaped clamp fastener mounting a disk clamp and a disk to a spindle motor, according to one embodiment of the invention.

Referring now to FIG. 4, FIG. 4 is a cross-sectional view showing the dome-shaped clamp fastener 402 mounting the disk clamp 404 of the disk 405 to the spindle motor 410, according to one embodiment of the invention. It should be appreciated that this is a small cross-sectional view that particularly illustrates the dome-shaped clamp fastener 402 mounted to the disk clamp 404 and the spindle motor 410 and does not illustrate many other components of the disk drive.

In particular, as can be seen in FIG. 4, the dome-shaped head 408 abuts the disk clamp 404 to connect the disk clamp 404 and disk 405 to the spindle motor 410. In particular, the threaded shank 420 of the dome-shaped clamp fastener 402 is screwed into a female-threaded receptacle 422 of the spindle motor 410 such that the dome-shaped clamp fastener 402 secures the disk clamp 404 and disk 405 to the spindle motor 410 such that the spindle motor 410 spins the disk 405. Further, other disks 405 and disk spacers 407 between disks 405 are also shown. Also, magnets 430 are mounted to the base 432 for use by the spindle motor 410 as part of the motor hub 435.

As can be particularly seen in FIG. 4, the dome-shaped head 408 of clamp fastener 402 is located slightly beneath the cover 450 of the disk drive such that the dome-shaped head 408 is nearer to the cover 450 than the clamp 404 to provide a point of contact with the cover near the center of axis of spindle rotation. Because of this, if the disk drive is squeezed by an individual (e.g., a user or manufacturer), the inside of the cover 450 may first come in contact with the top of the dome-shaped head 408 of the clamp fastener 402 instead of the disk clamp 404, the disk 405, or the other internal components. This may prevent the stopping of the rotation of the disk 405, the stopping or breaking of the spindle motor 410, damage to the media of the disk 405, damage to the internal components of the disk drive, or the generation of debris by the cover 450 contacting the internal components of the disk drive.

In particular, by the use of a dome-shaped head 408, a zero radius of contact over the top of this spinning motor is created such that the likelihood of the cover 450 contacting the disk clamp 404, the disk 405, or the other internal components of the disk drive to damage the internal components and/or create contamination is reduced. Thus, the potential pinching of the cover 450 against the disk clamp 404, the disk 405, and other internal disk drive components is minimized.

Figure 5:
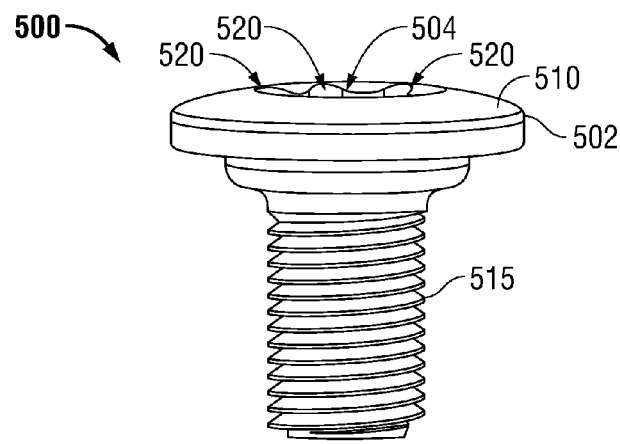
FIG. 5 is a side view of another type of clamp fastener having a convex head, according to one embodiment of the invention.

With reference to FIG. 5, a side view of another type of convex head is illustrated according to an embodiment. In this embodiment, a clamp fastener 500 having a convex head 502 that includes a centered opening 504 with a remaining tapered portion 510 is illustrated. For example, the clamp fastener 500 may be a screw or bolt with the convex head 502 and a threaded shank 515. In this embodiment, the centered opening 504 may include one or more driver recesses 520 (e.g., in this example six recesses) for receipt of a driver to rotate the clamp fastener 502 such that it mates with a receiving portion of the spindle motor.

Thus, clamp fastener 500 is similar to clamp fastener 402 except instead of a dome-shaped convex head, it includes a convex head 502 with a centered opening 504 for receipt of a driver to rotate the clamp fastener 500 for mating with the receiving portion of the spindle motor whereas the dome-shaped clamp fastener 402 previously described may be torqued for mating with the receiving portion of the spindle motor.

Figure 6:
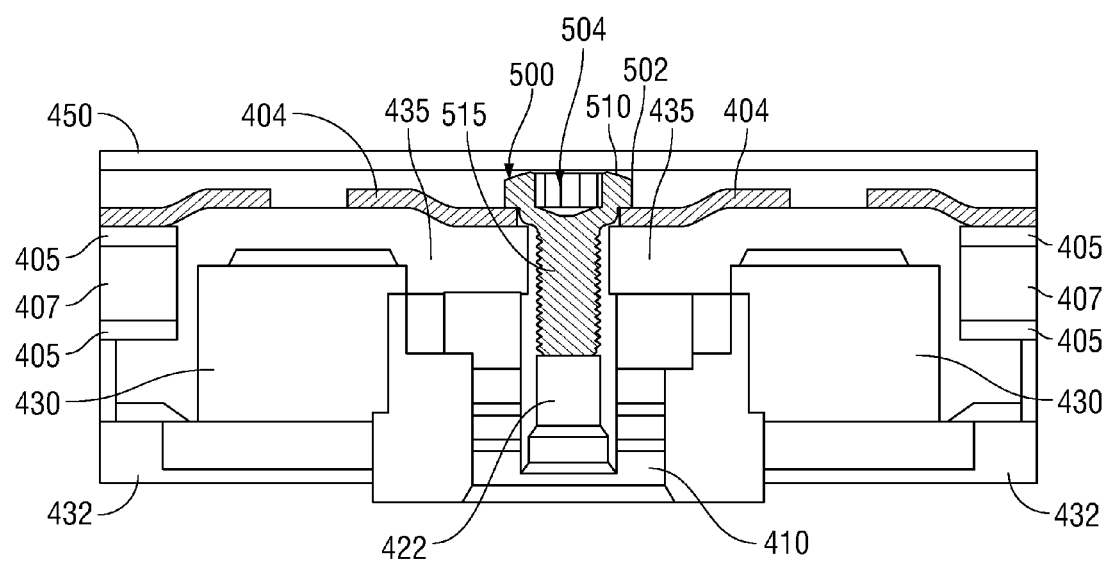
FIG. 6 is a cross-sectional view showing the convex head fastener of FIG. 5 mounting a disk clamp and a disk to a spindle motor, according to one embodiment of the invention.

FIG. 6 is a cross-sectional view showing the clamp fastener 500 mounting the disk clamp 404 of the disk 405 to the spindle motor 410, according to one embodiment of the invention. Since FIG. 6 is very similar to FIG. 4, similar descriptions of the internal components of the disk drive will not be repeated for brevity.

In particular, as can be seen in FIG. 6, the convex head 502 of clamp fastener 500 abuts the disk clamp 404 to connect the disk clamp 404 and disk 405 to the spindle motor 410. In particular, the threaded shank 515 of the clamp fastener 500 is screwed into the female-threaded receptacle 422 of the spindle motor 410 such that clamp fastener 500 secures the disk clamp 404 and disk 405 to the spindle motor 410 such that the spindle motor 410 spins the disk 405. As previously described, convex head 502 with centered opening 504 may receive a driver to rotate the clamp fastener 500 such that it mates with the female-threaded receptacle 422 of the spindle motor 410. Further, other disks 405 and disk spacers 407 between disks 405 are also shown. Also, magnets 430 are mounted to the base 432 for use by the spindle motor 410 as part of the motor hub 435.

As can be particularly seen in FIG. 6, the convex head 502 of clamp fastener 500 is located slightly beneath the cover 450 of the disk drive. Because of this, if the disk drive is squeezed by an individual (e.g., a user or manufacturer), the inside of the cover 450 may first come in contact with the top of the convex head 502 of clamp fastener 500 instead of the disk clamp 404, the disk 405, or the other internal components. This may prevent the stopping of the rotation of the disk 405, the stopping or breaking of the spindle motor 410, damage to the media of the disk 405, damage to the internal components of the disk drive, or the generation of debris by the cover 450 contacting the internal components of the disk drive due to pinch.

Further, in one embodiment, the convex head 408 of clamp fastener 402 of FIGS. 2-4 and the convex head 502 of clamp fastener 500 of FIGS. 5-6 may include a low friction coating. These types of low-friction coatings may include a diamond-like coating (DLC), a Teflon coating, or an organic coating.

Additionally, the cover 450 of the disk drive located above the convex head may also have a low-friction coating such as a diamond-like coating (DLC), a Teflon coating, or an organic coating. These types of coatings may further reduce the force of the cover 450 contacting the clamp fasteners 402,500, disk clamp 404, the disk 405, or the other internal components of the disk drive and the creation of contamination.

While embodiments of the invention and their various mechanical and functional components have been described in particular embodiments, it should be appreciated that the embodiments can be implemented with a wide variety of differing mechanical and electrical components, and combinations thereof. Further, although the previous embodiments have been described as being employed for use with disk drives, these embodiments may be implemented with numerous other types of disk drives or other types of storage devices with similar or other media format characteristics.

What is claimed is:

1. A disk drive comprising:
    a disk;
    a spindle motor;
    a cover;
    a disk clamp mounted to a top surface of the disk and having a recessed inner, central portion, an outer section, and a middle section, between the inner, central portion and the outer section, elevated relative to the inner, central portion and the outer section; and
    a clamp fastener having a convex head, the clamp fastener being mounted in the recessed inner, central portion and through the disk clamp to connect the disk clamp and the disk to the spindle motor such that the spindle motor spins the disk, wherein the convex head is nearer to the cover than the disk clamp.

2. The disk drive of claim 1, wherein the convex head is dome-shaped.

3. The disk drive of claim 2, wherein the convex head includes an outer surface for torqueing.

4. The disk drive of claim 2, wherein the convex head includes outer edges for torqueing.

5. The disk drive of claim 4, wherein the outer edges for torqueing form a hexagonal cap.

6. The disk drive of claim 1, wherein the convex head includes a centered opening and a remaining tapered portion.

7. The disk drive of claim 6, wherein the centered opening includes one or more slots for receipt of a driver to rotate the clamp fastener.

8. The disk drive of claim 1, wherein the clamp fastener is a screw.

9. The disk drive of claim 1, wherein the convex head of the clamp fastener includes an anti-friction coating.

10. The disk drive of claim 1, wherein the cover located above the convex head includes an anti-friction coating.

11. The disk drive of claim 1, wherein the convex head provides a single point of contact with the cover near the center of the axis of spindle rotation.

12. A method to reduce damage due to contact from a cover of a disk drive:
    mounting a disk clamp to a top surface of a disk, wherein the disk clamp comprises a recessed inner, central portion, an outer section, and a middle section, between the inner, central portion and the outer section, elevated relative to the inner, central portion and the outer section; and
    mounting a clamp fastener in the recessed inner, central portion and through the disk clamp to connect the disk clamp, the disk, and the clamp fastener to a spindle motor such that the spindle motor spins the disk, wherein the clamp fastener includes a convex head nearer to the cover than the disk clamp to reduce damage if the convex head is contacted by the cover.

13. The method of claim 12, wherein the convex head is dome-shaped.

14. The method of claim 13, further comprising torqueing an outer surface of the convex head to connect the clamp fastener to the spindle motor.

15. The method of claim 13, further comprising torqueing outer edges of the convex head to connect the clamp fastener to the spindle motor.

16. The method of claim 15, wherein the outer edges for torqueing form a hexagonal cap.

17. The method of claim 12, wherein the convex head includes a centered opening and a remaining tapered portion.

18. The method of claim 17, further comprising receiving a driver to rotate the clamp fastener in the centered opening.

19. The method of claim 12, wherein the clamp fastener is a screw.

20. The method of claim 12, wherein the convex head of the clamp fastener includes an anti-friction coating.

21. The method of claim 12, wherein the cover located above the convex head includes an anti-friction coating.

22. The method of claim 12, wherein the convex head provides a single point of contact with the cover near the center of the axis of spindle rotation.

\* \* \* \* \*